June 16, 1964  T. B. DILWORTH ETAL  3,137,375
RAILWAY VEHICLE GROUNDING DEVICE
Filed Feb. 9, 1961
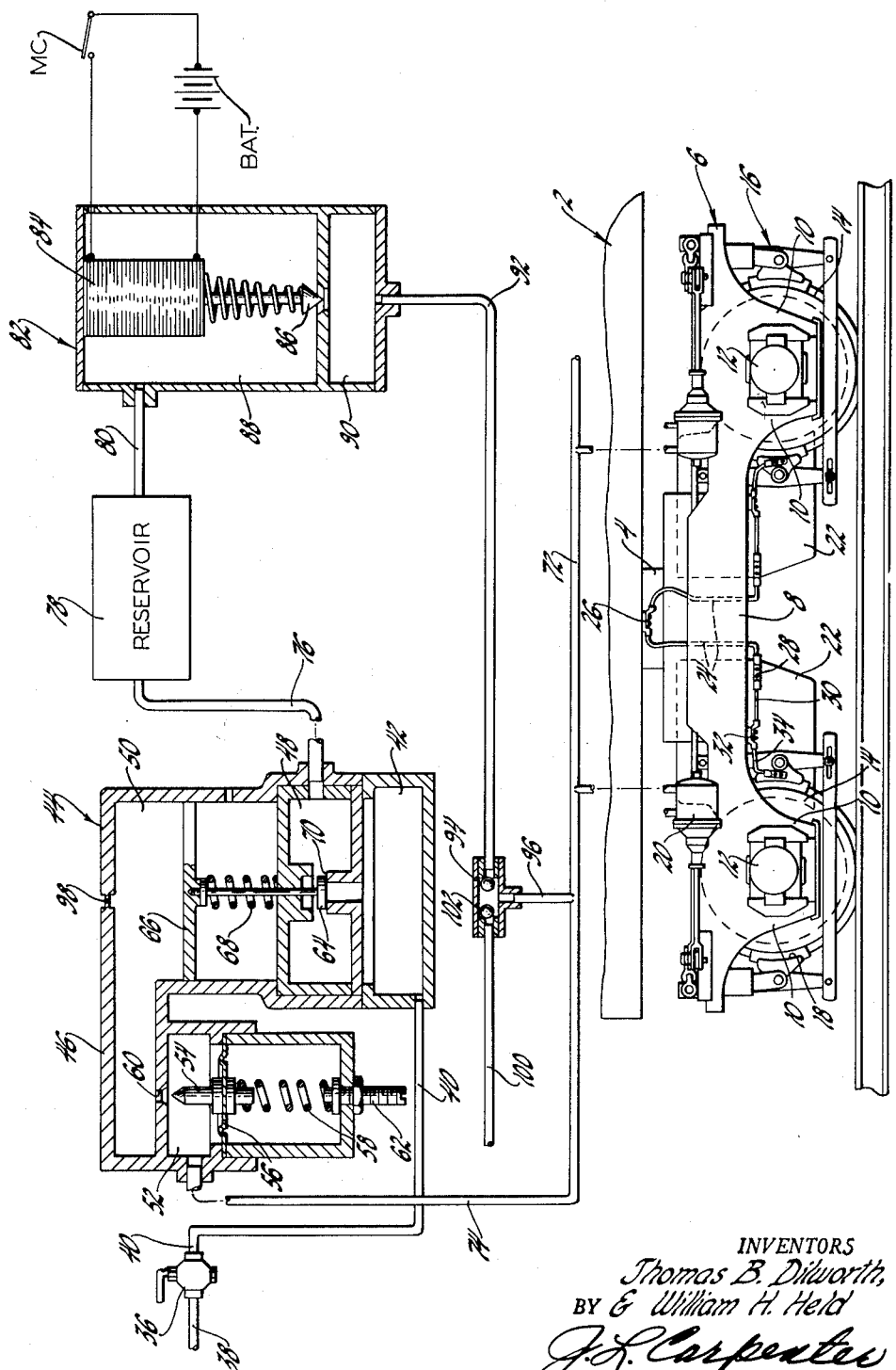
INVENTORS
Thomas B. Dilworth,
BY & William H. Held
J. L. Carpenter
ATTORNEY

United States Patent Office

3,137,375
Patented June 16, 1964

3,137,375
RAILWAY VEHICLE GROUNDING DEVICE
Thomas B. Dilworth, Hinsdale, and William H. Held, Lombard, Ill., assignors to General Motors Corporation, Detroit, Mich., a corporation of Delaware
Filed Feb. 9, 1961, Ser. No. 88,082
4 Claims. (Cl. 191—1)

This invention relates generally to electrically powered railway vehicles and more particularly to electrical grounding means for the metallic portions thereof to provide safety for both personnel and equipment on the vehicle.

It is well known that most locomotives used today are of the so-called "diesel electric" or "all electric" types. In fact many of the diesel electric locomotives used today are adapted to also operate as "all electric" locomotives by picking up electrical power from a third rail or overhead line. This feature enables them to be operated in long tunnels and other areas without running the diesel where the gaseous exhausts thereof would otherwise prove objectionable.

In many installations of this type, it is common practice to ground the low potential side of the various electrical components of these vehicles to metallic frame portions thereof. A difficulty is encountered, however, because differences of potential may occur between various metallic portions such as the frames unless a good conducting path to ground is provided which will assure that all such metallic portions are at the same potential. It has been found that the outer rails may be used to complete the electrical circuit when a third rail pickup is used. However, some suitable means is required to make this connection as inexpensive as possible.

It is, therefore, an object of this invention to provide a grounding circuit for the metallic portions such as the frames of an electrically powered railway vehicle.

It is a further object of this invention in order to reduce cost and to take advantage of equipment already present on the vehicle to use the brake rigging as a part of such a grounding circuit.

For a fuller understanding of this invention and the above and other objects thereof, reference may be made to the accompanying detailed description and drawing which is a schematic showing of the grounding circuit and brake rigging in conjunction with one trucked end of an electrically powered railway vehicle.

Referring to the drawing, an electrically powered railway vehicle is shown and has a fragmentary end thereof indicated generally by a numeral 2. The end 2 of the electrically powered railway vehicle has a depending kingpin bearing 4 which is supported by a truck assembly indicated generally by a numeral 6.

The truck assembly 6 includes the usual frame 8 with depending pedestal sets 10 at opposite ends thereof embracing journal box assemblies 12. The journal boxes 12 journal the ends of axles on which are mounted for rotation therewith flanged wheels 14. Suitable clasp-type brake riggings for the wheels 14 are each generally indicated by the numeral 16 and include brake head and shoe assemblies 18 on opposite sides of each wheel adapted to engage the respective wheel and brake it. The clasp brake riggings for each wheel are energized by an associated air brake cylinder 20. These riggings are typical of those found on railway vehicles in that energization of a cylinder 20 by applying pressure thereto causes the associated brake head and shoe assemblies 18 on opposite sides of the wheel to move toward each other and clamp the wheel therebetween.

Also mounted on the truck 6 are a pair of traction motors 22 whose one ends are directly supported on the axles of the truck and whose opposite ends are resiliently supported on springs interposed between the traction motor frames and the truck frame. These traction motors 22 may be connected to a source of electrical power such as a generator carried by the vehicle or to an electrical source via a third rail pickup. Their low potential sides may be grounded or electrically connected to the metallic portions of the vehicle such as the underframe of the vehicle 2 or the truck frame 8. To assure that personnel and equipment are not injured or damaged by the possible build-up of potential on these frames, it is necessary that they be properly grounded to the outside rails so that all large metallic parts of the vehicle such as the aforementioned frames will be at the same potential as that of the outside rails. This is accomplished by providing large efficient electrical conductors 24 which extend from and are securely fastened to the frame of the vehicle 2 and to the frames of the traction motors 22 by the terminal devices 26 and 28. Other large electrical conductors 30 extend from the terminals 28 on the traction motors 22 to terminals 32 on the truck frame 8. Finally another set of conductors 34 extend from the terminals 32 to the brake head and shoe assemblies 18.

Since all the connections made which involve the conductors 30 and 34 are efficiently current conducting, it is next necessary to assure that a good electrical contact is made between the rails and truck frame 8. This is accomplished by means of the brake head and shoe assemblies 18 and the wheels 14 and a light brake application therebetween. The means for achieving this light brake application are shown schematically immediately above the truck assembly and the end of the vehicle 2 which it supports.

Referring now to that upper portion of the drawing, it will be observed that there is provided a cutout cock 36 which has an air conductor 38 leading thereinto from a suitable pressure source such as the main reservoir which supplies other air using components of the vehicle such as the independent locomotive brake, train brakes, etc.

Leaving the opposite side of the cutout cock 36 is an air line 40 which leads into a chamber 42 provided in the lower part of a regulating valve indicated generally by a numeral 44. This regulating valve 44 includes a housing 46 which includes the aforementioned chamber 42 and intermediate chamber 48 and upper chamber 50 and a chamber 52. Enclosed in the chamber 52 and separating it into upper and lower portions is a needle valve 54 which is operatively connected to a diaphragm 56 acted upon by a helical spring 58. The needle valve 54 is adapted to control the opening and closing of a port 60 connecting chambers 50 and 52. The loading of the helical spring 58 may be changed by an adjusting screw 62. A second valve 64 is attached to a piston 66 located in the chamber 50. The piston 66 is acted upon by a helical spring 68 tending to maintain valve 64 off its seat 70. The chamber 52 is connected to the brake pipe 72 via an air conductor 74, so that whatever pressure occurs in the brake pipe and cylinders 20 will also be found in chamber 52. The air pressure supplied from the pressure source through the conductors 38, cutout cock 36, conductor 40 and chamber 42 moves past the valve 64 when open into chamber 48. From chamber 48 it passes via a conductor 76 to a reservoir 78 and thence via conductor 80 into an air magnet valve 82. The air magnet valve 82 comprises solenoid 84 which may be suitably energized by the closure of a switch MC to connect it across a suitable voltage source such as battery BAT. When air magnet valve 82 is energized, its needle valve 86 unseats to allow air pressure to be supplied from its upper chamber 88 to its lower chamber 90 and thence via a conductor 92 and double check valve 94 and conductor 96 to brake pipe 72.

The operation of the regulator valve 44 is as follows: When pressure is supplied from the main reservoir through air line 40 into chamber 42, the pressure along with the force exerted by spring 68 tends to lift valve 64 off its seat 70 and allow air to be supplied to the chamber 48 and out through pipe 76 to reservoir 78 and on through the air magnet valve when energized to the brake pipe 72. The pressure in the brake pipe 72, however, is transmitted through the pipe 72 into chamber 52 and against the diaphragm 56. This pressure against diaphragm 56 causes the needle valve 54 to open up and allows air to flow into chamber 50. The flow of air into chamber 50, however, is too great to allow all of the air to be exhausted through a choke 98 and, therefore, the pressure of this air in chamber 50 acts against piston 66 attached to valve 64 and causes the valve 64 to move toward its seat 70. Naturally when the valve 64 is seated, air can no longer be supplied via reservoir 78 and magnet valve 82 to brake pipe 72. Actually, when the switch MC is closed and air is being supplied to the regulating valve 44, a balance will be set up in the regulator valve wherein air will be supplied from the chamber 42 at a rate just sufficient to maintain the pressure in the brake pipe 72 at a light brake pressure preferably around 5.5 to 6.5 pounds per square inch.

It has been found that this slight pressure is not enough to retard the locomotive or add to the wear of brake shoe 2 but on the other hand does provide a good electrical connection between the brake head and shoe assemblies 18 and wheels 14. In other words, these brake head and shoe assemblies 18 literally act as grounding brushes. If it is desired to brake the locomotive when the slight braking pressure is being applied, sufficiently higher air pressure may be supplied via the pipe 100 past the check valve 102. This higher pressure will override that being supplied via the regulating valve 44 and the air magnet valve 82.

From the foregoing description, it will be appreciated that a unique highly efficient grounding circuit has been provided which makes use of the existing equipment on an electrically powered vehicle to thereby minimize cost while at the same time assuring the proper safety for personnel and equipment aboard the vehicle.

We claim:

1. A grounding circuit for a current conducting frame of an electrically powered railway vehicle having a current conducting supporting wheel comprising a current conducting brake shoe, an electrical cable connected directly between said frame and said shoe, means to maintain predetermined pressure between said shoe and wheel to provide electrical contact between said shoe and wheel, and brake actuating means operable independent of said first-mentioned means to override said first-mentioned means and control the pressure of said shoe against said wheel in order to brake said vehicle.

2. A grounding circuit for an electrically powered railway vehicle which includes a current conducting frame supported by a railway vehicle truck, said truck including a current conducting truck frame and a current conducting supporting wheel, said grounding circuit comprising a current conducting brake shoe supported by said truck frame, an electrical cable connected directly between said frame and said shoe, means to maintain predetermined pressure between said shoe and wheel to provide electrical contact between said shoe and wheel, and brake actuating means operable independent of said first-mentioned means to override said first-mentioned means and control the pressure of said shoe against said wheel in order to brake said vehicle.

3. A grounding circuit for a current conducting frame of an electrically powered railway vehicle having a current conducting supporting wheel comprising a current conducting brake shoe, an air brake cylinder operatively connected to said shoe, an electrical cable connected directly between said frame and said shoe, means operating said cylinder to maintain a predetermined pressure between said shoe and said wheel to thereby provide electrical contact between said shoe and wheel and means independent of said first means operable to further actuate said cylinder to increase pressure between said shoe and wheel to brake said vehicle.

4. A grounding circuit for a current conducting frame of an electrically powered railway vehicle having a current conducting supporting wheel comprising a current conducting brake shoe, an electrical cable connected directly between said frame and shoe, an air brake cylinder operatively connected to said shoe, a pressure regulating valve adapted to be connected to a pressure source, an air magnet valve energized to connect said regulating valve to said cylinder and thereby maintain predetermined pressure between said shoe and said wheel to maintain electrical contact between said shoe and wheel, and means connecting said cylinder to said pressure source by by-passing said regulating valve to cause said cylinder to increase the pressure between said shoe and wheel and brake said vehicle.

References Cited in the file of this patent

UNITED STATES PATENTS

| | | |
|---|---|---|
| 579,527 | Westinghouse | Mar. 23, 1897 |
| 871,457 | Thayer | Nov. 19, 1907 |
| 1,831,714 | Latshaw | Nov. 10, 1931 |
| 1,902,504 | Howell | Mar. 21, 1933 |
| 2,053,302 | Saito | Sept. 8, 1936 |
| 2,474,534 | Knost | June 28, 1949 |
| 2,547,710 | Lee | Apr. 3, 1951 |
| 2,549,471 | Hutchison | Apr. 17, 1951 |
| 2,685,621 | Callender | Aug. 3, 1954 |
| 2,686,891 | Burgin | Aug. 17, 1954 |
| 2,809,242 | Dean | Oct. 8, 1957 |
| 2,877,870 | Tack et al. | Mar. 17, 1959 |